May 2, 1939.     H. L. SMITH, JR., ET AL     2,156,317
AIR CONDITIONING CONTROL
Filed Nov. 20, 1934
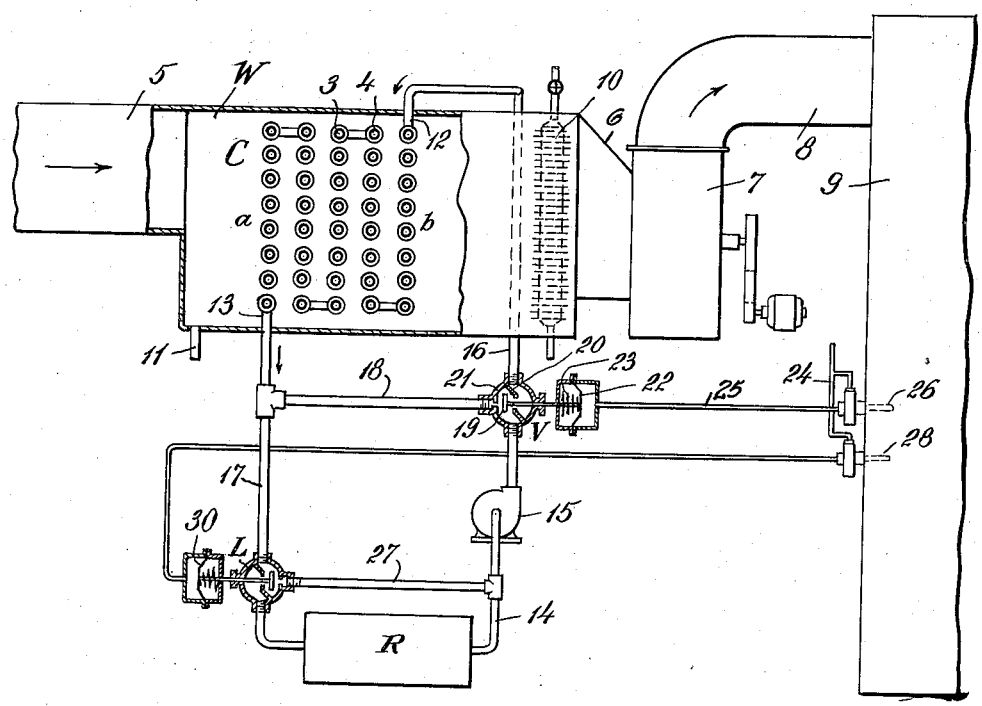
INVENTOR
Horace L. Smith Jr. and
Lucian N. Jones
BY
Pennie, Davis, Marvin & Edmonds
ATTORNEYS Patented May 2, 1939

2,156,317

UNITED STATES PATENT OFFICE 2,156,317

AIR CONDITIONING CONTROL

Horace L. Smith, Jr., and Lucian N. Jones, Richmond, Va., assignors, by mesne assignments, to Niagara Blower Company, New York, N. Y., a corporation of New York Application November 20, 1934, Serial No. 753,840

4 Claims. (Cl. 62—6)

This invention relates to air conditioning control and more particularly concerns improved control means for air conditioning apparatus of the surface cooler type.

In conditioning air for use in enclosures such as homes, offices, public auditoriums and factories, the two primary problems involved are maintaining the dry bulb temperature at the proper degree and maintaining the desired relative humidity. During warmer months of the year, when air conditioning is most generally employed, these problems involve the cooling of the air by extracting sensible heat therefrom and the dehumidification of the air.

Most known air conditioning systems cool and dehumidify air by treating it in a washer chamber wherein the air is passed through a fine mist or spray of chilled water. The spray water temperature is reduced to a value which cools the air below its dewpoint, and thereby reduces the moisture content of the air to the desired value. The air leaves the washer in a saturated condition and is reheated to a comfortable temperature by suitable means.

Air washers of the type described are unsatisfactory in many respects. Because of the bulk of the spray air washer proper, as well as its auxiliary equipment, this device is not adaptable to installations where limited space is available. The spray washer must be employed as a single centrally located unit rather than in the form of small units placed at the desired locations in the building. Further, a possibility of water leakage prevents the use of spray air washers in many buildings where a water leakage hazard cannot be tolerated.

The above noted and other disadvantages of spray type air washers are eliminated by the use of so-called surface coolers, that is, coils or containers through which a chilled cooling medium is circulated and over the surfaces of which the air under treatment is passed. In the past, the use of such surface coolers in air conditioning work has been largely limited to installations in which accurate control of the air temperature and relative humidity is unimportant, and this for the reason that no effective means has been devised for accurately and separately controlling the dry bulb temperature and the wet bulb temperature or humidity of the air treated by a surface cooler. The problem of controlling an air conditioner is quite exacting as many independent sources of heat and moisture in the space being conditioned cause sudden changes in the cooling and dehumidifying loads imposed. If reasonably comfortable conditions are to be maintained, the amounts of sensible heat and moisture extracted from the air to be treated must be separately and rapidly varied in response to the dry bulb temperature and the humidity or wet bulb temperature respectively.

With the above and other considerations in mind, it is proposed in accordance with the present invention, to provide an improved and simplified control system for an air conditioner of the surface cooler type, which system separately and accurately varies the amounts of heat extracted from the treated air as sensible heat and as latent heat of condensation in accordance with the dry bulb temperature and the wet bulb temperature or relative humidity conditions in the conditioned space respectively.

In general, the above and other objects of the invention are carried out by providing a suitable surface cooler over which air is passed prior to its introduction to a conditioned space, by variably controlling the rate of flow of a cooling medium through the interior of the cooler in accordance with changes in temperature conditions in the conditioned space whereby the amount of heat absorbed from the air as sensible heat is controlled, and by variably controlling the temperature of the cooling medium introduced to the cooler in accordance with changes in humidity conditions or wet bulb temperature in the conditioned space whereby the amount of heat extracted from the air as latent heat of condensation is separately controlled.

The invention will be best understood by reference to the accompanying drawing, in which certain embodiments thereof have been illustrated. In the drawing:

The figure is a diagrammatic representation of an air conditioning system embodying our invention.

In accordance with our invention, a surface cooler of suitable form is disposed in heat exchanging relation with air which is subsequently delivered to an enclosure in which conditioned air is required. Various forms of surface coolers may be used and in general, this device should comprise one or more continuous closed ducts having heat absorbing walls exposed to the stream of air to be conditioned. As illustrated, the surface cooler C may take the form of a continuous coil of pipe 3 which may be provided with heat absorbing projections such as the fins 4 on the outer surface thereof. The surface cooler may be disposed in direct contact with the air in the enclosure to be conditioned, but it is generally preferred to circulate air over the cooler and into the enclosure.

The surface cooler C is disposed in a conditioning chamber W having an inlet duct 5 and an outlet duct 6. A motor-driven fan 7 is preferably connected to the outlet duct 6 of the chamber W and the outlet of the fan 7 is connected through a duct 8 to a room or other enclosure 9 in which conditioned air is required. The air supplied to the inlet duct 5 may comprise outdoor air, air withdrawn from the enclosure 9 or a mixture of both, and the conditioned air passed through the duct 8 may be mixed with withdrawn air before delivery to the enclosure in accordance with known practice. Suitable means, such as the steam radiator 10, may be provided for at times reheating the conditioned air leaving the chamber W. A drain 11 is preferably provided at the bottom of the chamber W for carrying off moisture condensed from the air by the surface cooler C. A suitable fluid cooling medium, such as chilled water, is circulated through the surface cooler coil 3 from the inlet end 12 to the outlet end 13 thereof by means which will hereinafter be described. It is preferred that the conditioned air and the cooling medium flow countercurrent, that is, the air preferably passes through the chamber W from the outlet end 13 of the coil 3 to the inlet end 12 thereof as shown.

In accordance with our invention, the rate of flow of the cooling medium through the surface cooler is varied in order to vary the amount of sensible heat extracted from the air being conditioned and thereby to control the dry bulb temperature of the conditioned enclosure. When a cooling medium, such as chilled water at a constant temperature, is supplied to the coil 3 through its inlet end 12, the reduction in temperature of the air passing over the coil 3 depends upon the mean effective difference in temperature between the water in the coil and the air passing over the coil. This mean effective difference may be expressed by the following formula:

$$\frac{D_1 - D_2}{\log_e \frac{D_1}{D_2}}$$

where $D_1$ is the difference between the temperature of the air at $a$ as it first contacts the coil 3 and the temperature of the water as it leaves the coil, and $D_2$ is the difference between the temperature of the air at $b$ as it leaves the coil and the temperature of the water at 12 as it enters the coil. Rewriting this formula in terms of temperature difference, it becomes $$\frac{\text{(air temperature at } a\text{—water temperature at 13)} - \text{(air temperature at } b\text{—water temperature at 12)}}{\text{Log}_e \frac{\text{(air temperature at } a\text{—water temperature at 13)}}{\text{(air temperature at } b\text{—water temperature at 12)}}}$$

Assuming a constant entering water temperature at 12 and a constant entering air temperature at $a$, it is apparent from the formula that the mean effective difference in temperature between the air and the water increases as the difference between leaving and entering water temperatures decreases. In other words, with given temperatures for entering air and entering water, the lower the leaving water temperature, the greater the cooling of the air which is effected.

If the cooling water is circulated through the coil 3 at a very slow rate, its leaving temperature will rise to a value close to that of the entering air, and as the rate of water flow is increased, the leaving water temperature will drop. Thus the mean effective difference in temperature between the water and the air, and consequently the amount of heat absorbed by the water from the air, may be accurately variably controlled by varying the rate at which the water flows through the coil. An increase in the rate of water flow lowers the leaving water temperature and hence increases the amount of heat absorbed from the air, thereby reducing the leaving air temperature, and conversely, a decrease in the rate of water flow raises the leaving water temperature and lowers the amount of heat absorbed from the air, thereby raising the leaving air temperature.

Applying the above principles, we have provided suitable means for circulating a chilled cooling medium such as water through the coil at a variable rate controlled by temperature conditions in the enclosure 9. Chilled water from a cooler R is supplied through a pipe 14, a pump 15 and a pipe 16 to the inlet end 12 of the coil 3 and is returned from the outlet end 13 of the coil through the pipe 17 to the cooler R. The water passing through the cooler R is refrigerated by a suitable refrigerating system or in any other desired manner. The rate of flow of water through the coil 3 may be changed by varying the speed of the pump 15, but we prefer to employ a by-pass for this purpose. Accordingly, a by-pass pipe 18 is connected between the supply pipe 16 and the return pipe 17, and a three-way valve V is provided to variably control the division of water between the supply pipe 16 and the by-pass pipe 18.

The valve V may take any suitable form, and as shown, comprises a gate 19 which in its extreme outer position engages the seat 20 and diverts all of the water from the pump 15 through the by-pass 18, and when in its extreme inner position, engages the seat 21 and diverts all of the water through the supply pipe 16 and coil 3. At intermediate positions of the gate 19, the water supplied by the pump 15 is divided between the by-pass 18 and the supply pipe 16 in varying proportions. The valve gate 19 is operated by a flexible diaphragm 22 which is biased toward its outer position by the spring 23. The diaphragm 22 is enclosed in an air chamber, and compressed air from a suitable supply is conducted to this chamber through a pipe 25 connected through a temperature responsive means such as the dry bulb thermostat 26.

The dry bulb thermostat 26 is suitably disposed to be responsive to temperature conditions in the enclosure 9. As shown, the sensitive element of this instrument is disposed within the enclosure, but it should be understood that the instrument might be placed in a return air duct leading from the room, if desired.

The dry bulb thermostat 26 is of known construction and is suitably designed to control the flow of compressed air from a source indicated by the pipe 24 to the operating diaphragm 22 of the valve V in accordance with temperature variations in the enclosure 9. The thermostat 26 is designed to increase the air pressure on the diaphragm 22 and so operate the valve V to increase the rate of flow of cooling medium through the surface cooler coil 3 in response to an increase in dry bulb temperature of the enclosure 9, and to reduce the air pressure and thereby reduce the rate of cooling medium flow in response to a drop in the dry bulb temperature in the enclosure. In this manner, the rate of flow of cooling medium through the coil 3 and consequently the amount of sensible heat absorbed by the surface cooler from the air in the chamber W, is varied in accordance with changes in the dry bulb temperature in the enclosure.

Particularly during the warmer seasons, it is frequently desirable to condense moisture from the air supplied to the enclosure, and frequently this dehumidification must take place without material reduction in the dry bulb temperature of the air. In accordance with our invention, the dehumidification of the air by the surface cooler is variably controlled in accordance with humidity conditions in the enclosure by varying the temperature of the cooling medium passed through the coil 3 and thus varying the surface area of the coil, over which condensation takes place.

When dehumidification is required, the temperature of the cooling medium is reduced to a suitable value below the dewpoint of the entering air by means hereinafter described. This results in the condensation of moisture from the air over a portion of the coil 3 extending from its inlet end 12 to some intermediate point determined by the temperature of the entering liquid. Thus as the temperature of the liquid is lowered, the point at which condensation stops moves toward the exit end of the coil 3 thereby increasing the surface area on which the condensation takes place, and conversely, as the liquid temperature is increased, the point of cessation of condensation moves back toward the inlet end 12 of the coil 3 and the surface area over which condensation takes place is reduced. In this manner, the amount of moisture condensed from the air by the surface cooler can be variably controlled in an accurate and simple manner, and the area of condensation on the coil may be restricted so that a minimum reduction in dry bulb temperature takes place as an incident to the dehumidifying action.

The above described cooling liquid temperature variation may be accomplished by changing the temperature of the cooler R, but we prefer to maintain a constant cooler temperature and to by-pass varying quantities of the cooling medium around the cooler under the control of the humidity conditions in the enclosure. To this end, a by-pass pipe 27 is connected between the inlet pipe 17 of the cooler R and the outlet pipe 14 thereof and the amount of liquid by-passed around the cooler is varied by a three-way valve L under the control of a humidity responsive instrument, such as a wet bulb thermostat or hygrostat 28 responsive to humidity conditions in the enclosure 9. The valve L is similar to the valve V, having a gate 29 which increases the proportion of liquid by-passed around the cooler R when the air pressure on the valve operated diaphragm 30 is reduced and increases the proportion of liquid passed through the cooler R as this air pressure is increased.

The wet bulb thermostat or hygrostat 28 is of known construction and is designed to control the flow of compressed air from the supply pipe 24 to the operating diaphragm 30 of the valve L, in accordance with changes in the temperature of evaporation or humidity in the enclosure 9. As the wet bulb temperature or relative humidity in the enclosure 9 rises, the instrument 28 increases the air pressure on the operating diaphragm 30 of the valve L and so increases the proportion of liquid passed through the cooler R with a consequent decrease in the temperature of the liquid entering the coil 3 and increase in the amount of moisture condensed from the air of the surface cooler. Conversely, as the wet bulb temperature or relative humidity in the enclosure 9 drops, the instrument 28 lowers the air pressure on the valve diaphragm 30, increases the proportion of liquid by-passed around the cooler R and so raises the liquid temperature with a consequent decrease in the amount of moisture condensed from the air.

From the above description, it will be apparent that our improved control system provides a simple and effective means for separately variably controlling the dry bulb temperature and the relative humidity of the air treated by the surface cooler. By varying the rate of flow of cooling medium through the surface cooler coil while the temperature of this medium remains at or slightly above the dewpoint of the entering air, the dry bulb temperature of the air may be varied as desired between its initial value and a temperature close to but above the dewpoint without condensing any moisture from the air. Further, by lowering the cooling medium temperature to variable values below the dewpoint of the entering air, any desired amount of moisture within the capacity of the system may be condensed from the air supplied to the enclosure.

Although the dry and wet bulb controls of our system separately govern the cooling and dehumidifying effects of the surface cooler, the action of these controls is, of course, interrelated. Thus if the wet bulb control causes a change in entering cooling medium temperature, this change will, of course, alter the dry bulb temperature of the air and the dry bulb control will automatically change the rate of flow of the cooling medium to maintain the desired dry bulb temperature. The same procedure takes place when the dry bulb control changes the rate of flow of the cooling medium during a period when dehumidification is taking place, the wet bulb control compensating for such change in rate of flow by altering the cooling medium temperature to the extent necessary to maintain the desired amount of dehumidification.

We claim:

1. In an air conditioning system, in combination with an enclosure in which conditioned air is required, means for supplying a stream of air to said enclosure, a surface cooler, means for passing all of the air in said stream in heat exchanging relation with the entire surface of said cooler, means for supplying a cooling medium to said surface cooler, means for varying the rate of flow of at least a part of the cooling medium supplied to said surface cooler in accordance with changes in the dry bulb temperature in said enclosure and means for varying the temperature of at least a part of the cooling medium supplied to said surface cooler in accordance with changes in the wet bulb temperature in said enclosure.

2. In an air conditioning system, in combination with an enclosure in which conditioned air is required, means for supplying a stream of air to said enclosure, a surface cooler having a continuous duct therethrough, means for passing all of the air in said stream in heat exchanging relation with the entire surface of said surface cooler, means for supplying a fluid cooling medium to said duct, means for varying the rate of supply of said cooling medium to said duct in accordance with changes in the dry bulb temperature in said enclosure and means for varying the temperature of said cooling medium supplied to said duct in accordance with changes in the wet bulb temperature in said enclosure.

3. In an air conditioning system, in combination with an enclosure in which conditioned air is required, means for supplying a stream of air to said enclosure, a continuous coil having an inlet end and an outlet end, means for passing all of the air in said stream in heat exchanging relation with the entire outer surface of said coil from the outlet end to the inlet end thereof, means for circulating a cooling liquid into said coil from the inlet end to the outlet end thereof, means for varying the rate of flow of said liquid through said coil in accordance with changes in the dry bulb temperature in said enclosure and means for varying the temperature of the liquid entering said coil in accordance with changes in the wet bulb temperature in said enclosure.

4. In an air conditioning system, in combination with a surface cooler, an enclosure, in which conditioned air is required, means for supplying a stream of air to said enclosure, and means for passing all of the air in said stream in heat exchanging relation with the entire surface of said cooler, means for circulating a fluid cooling medium through said surface cooler, means for variably controlling the rate of flow of said cooling medium through said cooler in accordance with changes in temperature conditions in said enclosure and means for variably controlling the temperature of the cooling medium entering said surface cooler in accordance with changes in humidity conditions in said enclosure.

HORACE L. SMITH, JR.
LUCIAN N. JONES.